(12) United States Patent
Nunez-Regueiro et al.

(10) Patent No.: US 9,332,862 B2
(45) Date of Patent: May 10, 2016

(54) REFRIGERATOR DOOR/WINDOW

(71) Applicant: Guardian Industries Corp., Auburn Hills, MI (US)

(72) Inventors: Jose Nunez-Regueiro, Ann Arbor, MI (US); David D. McLean, Royal Oak, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 13/690,133

(22) Filed: Nov. 30, 2012

(65) Prior Publication Data

US 2014/0154434 A1 Jun. 5, 2014

(51) Int. Cl.
| | |
|---|---|
| *A47F 3/04* | (2006.01) |
| *E06B 3/67* | (2006.01) |
| *E06B 3/66* | (2006.01) |
| *C03C 3/087* | (2006.01) |
| *C03C 4/00* | (2006.01) |
| *C03C 17/36* | (2006.01) |

(52) U.S. Cl.
CPC ............... *A47F 3/0434* (2013.01); *C03C 3/087* (2013.01); *C03C 4/0092* (2013.01); *C03C 17/366* (2013.01); *C03C 17/3626* (2013.01); *C03C 17/3639* (2013.01); *C03C 17/3644* (2013.01); *C03C 17/3652* (2013.01); *E06B 3/66* (2013.01); *E06B 3/6715* (2013.01); *C03C 2217/231* (2013.01); *C03C 2217/734* (2013.01); *C03C 2217/94* (2013.01); *C03C 2217/948* (2013.01); *C03C 2218/365* (2013.01); *Y10T 428/24942* (2015.01); *Y10T 428/265* (2015.01)

(58) Field of Classification Search
CPC ....... C03C 17/366; A47F 3/0434; E06B 3/66; E06B 3/6612; E06B 3/6715
See application file for complete search history.

(56) References Cited

U.S. PATENT DOCUMENTS

| | | | | |
|---|---|---|---|---|
| 3,609,293 | A | * 9/1971 | Stewart ................. | E06B 3/6715 219/200 |
| 3,798,050 | A | 3/1974 | Franz et al. | |
| 4,035,608 | A | * 7/1977 | Stromquist ........... | A47F 3/0434 219/213 |
| 4,187,336 | A | * 2/1980 | Gordon ........................... | 428/34 |
| 4,206,615 | A | * 6/1980 | Sobajima .............. | A47F 3/0434 219/218 |
| 5,156,894 | A | * 10/1992 | Hood ........................ | E04C 2/54 156/109 |
| 5,342,676 | A | * 8/1994 | Zagdoun ............. | C03C 17/3417 428/212 |

(Continued)

OTHER PUBLICATIONS

"An Introduction to Insulating Glass," Insulating Glass Manufacturers Alliance (IGMA), Aug. 2011. Retrieved from www.igmaonline.org/technical on Jan. 22, 2014. (NPL_IGMA_Presentation).*

(Continued)

*Primary Examiner* — Aaron Austin
*Assistant Examiner* — Zheren J Yang
(74) *Attorney, Agent, or Firm* — Nixon & Vanderhye P.C.

(57) ABSTRACT

Refrigerator doors (which includes freezer doors) are provided for use in display areas where refrigerated merchandise (e.g., frozen or chilled food) is displayed. It is desired to increase energy efficiency of the doors and thus of the refrigerated display system, while at the same time reducing visible reflectance from the doors to make it easier for customers to see merchandise which is being displayed behind the transparent doors. Refrigerator doors according to certain example embodiments of this invention include one or more AR coatings, some of which may include a transparent conductive layer (e.g., ITO) so as to also function as a low-E coating.

3 Claims, 5 Drawing Sheets

(56) References Cited

U.S. PATENT DOCUMENTS

| | | | |
|---|---|---|---|
| 5,520,996 A * | 5/1996 | Balian | C03C 17/3417 428/216 |
| 5,776,594 A * | 7/1998 | Austin | B32B 17/06 359/359 |
| 5,780,149 A * | 7/1998 | McCurdy | B32B 17/06 359/359 |
| 6,052,965 A * | 4/2000 | Florentin | A47F 3/0434 52/786.1 |
| 6,148,563 A * | 11/2000 | Roche | A47F 3/0434 49/501 |
| 6,231,999 B1 * | 5/2001 | Krisko | 428/627 |
| 6,251,482 B1 | 6/2001 | Laroche et al. | |
| 6,284,382 B1 | 9/2001 | Ishikawa et al. | |
| 6,380,480 B1 * | 4/2002 | Norimatsu | H01L 31/02162 136/249 |
| 6,783,253 B2 | 8/2004 | Thomsen et al. | |
| 6,797,388 B1 * | 9/2004 | Szanyi | C03C 17/3417 427/164 |
| 7,678,459 B2 | 3/2010 | Scott et al. | |
| 8,293,344 B2 | 10/2012 | Lemmer et al. | |
| 8,303,124 B2 | 11/2012 | O'Connor et al. | |
| 8,304,045 B2 | 11/2012 | Lemmer et al. | |
| 2003/0113550 A1 * | 6/2003 | Millett | A47F 3/0434 428/432 |
| 2003/0157339 A1 * | 8/2003 | Sawada | B32B 17/10036 428/432 |
| 2003/0179343 A1 * | 9/2003 | Marechal | G02B 1/116 351/159.62 |
| 2003/0179454 A1 | 9/2003 | Thomsen et al. | |
| 2003/0199384 A1 * | 10/2003 | Landa | C03C 1/004 501/71 |
| 2004/0214010 A1 * | 10/2004 | Murata | A47F 3/0434 428/426 |
| 2004/0222724 A1 * | 11/2004 | Cording | A47F 3/0434 312/405 |
| 2005/0083576 A1 | 4/2005 | Stachowiak et al. | |
| 2005/0202178 A1 * | 9/2005 | Roche | A47F 3/0434 427/385.5 |
| 2006/0005484 A1 * | 1/2006 | Riblier | A47F 3/0434 52/204.5 |
| 2006/0090834 A1 * | 5/2006 | Huang | B32B 17/10009 156/99 |
| 2006/0188730 A1 * | 8/2006 | Varanasi | A47F 3/0434 428/432 |
| 2006/0265979 A1 * | 11/2006 | Cording | A47F 3/0434 52/204.5 |
| 2009/0068384 A1 * | 3/2009 | Seth | B32B 17/10 428/34 |
| 2009/0075069 A1 * | 3/2009 | Myli | C03C 17/002 428/336 |
| 2009/0117371 A1 * | 5/2009 | Glaeser | C03C 17/3417 428/332 |
| 2009/0214880 A1 * | 8/2009 | Lemmer | 428/432 |
| 2009/0320824 A1 * | 12/2009 | Henn | C03C 17/3417 126/500 |
| 2011/0176212 A1 | 7/2011 | Lu et al. | |
| 2011/0210656 A1 * | 9/2011 | Lemmer | E06B 3/6715 312/405 |
| 2011/0212311 A1 * | 9/2011 | Lemmer | C03C 17/3417 428/212 |
| 2011/0223415 A1 * | 9/2011 | Drescher | C03C 17/3417 428/336 |
| 2011/0256325 A1 * | 10/2011 | Sanderson | B32B 17/10036 428/34 |
| 2011/0262694 A1 * | 10/2011 | Janssen | C03C 17/3435 428/119 |
| 2011/0300319 A1 * | 12/2011 | Reymond | C03C 17/36 428/34 |
| 2011/0305853 A1 * | 12/2011 | Reymond | C03C 17/36 428/34 |
| 2012/0021149 A1 * | 1/2012 | Myli | C03C 17/3411 428/34 |
| 2012/0064265 A1 * | 3/2012 | Suh | C03C 17/007 428/34 |
| 2012/0090246 A1 * | 4/2012 | Nunez-Regueiro | A47F 3/0434 49/484.1 |
| 2012/0164420 A1 | 6/2012 | Lemmer et al. | |
| 2012/0250314 A1 | 10/2012 | Maikowski et al. | |
| 2013/0019616 A1 * | 1/2013 | Reichert | A47F 3/0434 62/80 |
| 2013/0089684 A1 * | 4/2013 | Pesce | C03C 17/245 428/34 |
| 2013/0129945 A1 * | 5/2013 | Durandeau | C03C 17/3417 428/34 |
| 2013/0149473 A1 * | 6/2013 | Frank | C03C 17/36 428/34 |
| 2013/0280447 A1 * | 10/2013 | Suzuki | B60J 3/007 428/34 |
| 2013/0318892 A1 * | 12/2013 | Grommesh | E06B 3/66304 52/171.3 |
| 2013/0337200 A1 * | 12/2013 | Noethe | C03C 17/36 428/34 |
| 2014/0004283 A1 * | 1/2014 | Bouesnard | C03C 17/3417 428/34 |
| 2014/0237917 A1 * | 8/2014 | Theios | C03C 17/366 52/203 |
| 2015/0275567 A1 * | 10/2015 | Jun | E06B 3/66 428/34 |

OTHER PUBLICATIONS

Presentation on Insulating Glass from the Insulating Glass Manufactures Alliance (IGMA) ("IGMA presentation", An Introduction to Insulating Glass, IGMA, Jun. 2011). Retrieved on Jan. 25, 2014 from IGMA website.*

Presentation on Insulating Glass from the Insulating Glass Manufactures Alliance (IGMA). Published in Jun. 2011, retrieved on Jan. 25, 2014 from IGMA website.*

* cited by examiner

REFRIGERATOR DOOR/WINDOW

FIELD OF THE INVENTION

Certain example embodiments of this invention relate to refrigerator/freezer doors/windows, and/or methods of making the same. Example embodiments of this invention relate to refrigerator/freezer doors/windows that include at least one coating that functions as both an anti-reflective (AR) coating and a low-emissivity (low-E) coating. In certain example embodiments, the coating may include a layer of or including indium-tin-oxide (ITO) located between at least a first dielectric layer of or including silicon oxynitride and a second dielectric layer of or including silicon oxide.

BACKGROUND AND SUMMARY OF EXAMPLE EMBODIMENTS OF THE INVENTION

Refrigerator doors are known in the art. For example, see U.S. Patent Document Nos. 2010/0209730 and 2012/0090246, the disclosures of which are hereby incorporated herein by reference.

Refrigerated merchandisers often display food products in a product display area. In order to reduce the amount of heat entering the refrigerated area, they often include glass doors that also provide visibility and accessibility to consumers. Because glass is a poor thermal insulator, such doors often include two or three separates panes of glass with one or two spaces between them to increase the thermal insulation of the door. Thus, current refrigerator doors may often be thought of as including one or two insulating glass units (IGUs).

Because of the need for increased energy efficiency of refrigerated display systems, increased thermal insulation of the IGU can be achieved by using low-emissivity (low-E) coatings on one or more of the inner surfaces of the IGU. In one application known as "retrofit," open refrigerated displays in food stores (i.e., displays with no glass doors) can be retrofitted with glass doors of the single of double pane type in order to minimize thermal loss from the refrigerated area thereby increasing the energy efficiency of the system. An undesired consequence of providing glass doors in refrigerated display areas is the loss or reduction of impulse sales, because customers now have a physical barrier between the merchandise and themselves. In this respect, the increase in visible reflectance which typically occurs when glass doors are provided in a refrigerated display area increases distortions and makes the merchandise (e.g., food) behind the doors difficult for shoppers to clearly see—this leads to reduced impulse sales.

Unfortunately, however, one undesirable consequence of this approach involves the rapid loss of light transmission through the IGU as more glass panes and more low-E coatings are incorporated. This, in turn, results in diminished marketing value of the door.

Thus, it will be appreciated that there is a need in the art for increasing the energy efficiency of the IGUs that make up refrigerator doors while at the same time increasing the visible light transmission through it, and methods of making the same.

U.S. Patent Document No. 2012/0090246 discloses a three pane refrigerator door including AR coatings and, low-E coatings. However, discrete silver based low-E coatings like the ones in the '246 patent document use up an entire available surface of a glass substrate that could otherwise be used for an AR coating. Therefore, in certain example embodiments of this invention, it is desirable to provide a solution that, at least in some instances, combines an infrared (IR) reflecting low-E layer with an AR layer structure in a single coating.

In certain example embodiments of this invention, refrigerator doors/windows (which includes freezer doors/windows) are provided for use in display areas where refrigerated merchandise (e.g., frozen or chilled food) is displayed. It is desired to increase energy efficiency of the doors and thus of the refrigerated display system, while at the same time reducing visible reflectance from the doors to make it easier for customers to see merchandise which is being displayed behind the transparent doors. Refrigerator doors (including windows) according to certain example embodiments of this invention include one or more AR coatings, some of which may include a transparent conductive layer (e.g., ITO) that reflects IR so as to also function as a low-E coating. Improvements can be achieved by combining, in one coating, AR functionality and low-E functionality. It is also possible that low-iron type glass may be used in the doors in certain example instances, which renders the doors even more transparent to visible light.

In certain example embodiments of this invention, there is provided a transparent refrigerator door/window comprising: at least first and second glass substrates; a combination anti-reflective and low-E coating on an interior surface of the first glass substrate, so that the coating is not exposed to a refrigerated environment adjacent the refrigerator door/window or a room environment adjacent the refrigerator door/window; wherein the coating comprises a transparent conductive layer comprising or consisting essentially of indium-tin-oxide (ITO) that is located between at least a dielectric layer comprising or consisting essentially of silicon oxynitride and a dielectric layer comprising or consisting essentially of silicon oxide, and wherein the dielectric layer comprising silicon oxynitride is located between at least the first glass substrate and the transparent conductive layer comprising ITO.

In certain example embodiments of this invention, there is provided a transparent refrigerator door/window comprising: at least first and second glass substrates; a combination anti-reflective and low-E coating on an interior surface of the first glass substrate, so that the coating is not exposed to a refrigerated environment adjacent the refrigerator door/window or a room environment adjacent the refrigerator door/window; wherein the coating comprises an IR reflecting transparent conductive oxide layer having a refractive index of from 1.8 to 2.0 that is located between at least a first dielectric layer having a refractive index of from 1.65 to 1.85 and a second dielectric layer having a refractive index of from 1.5 to 1.7, and wherein the first dielectric layer is located between at least the first glass substrate and the transparent conductive oxide layer; and wherein the transparent conductive oxide layer has a refractive index (n) at least 0.1 higher than respective refractive indices of the first and second dielectric layers.

In certain example embodiments of this invention, there is provided a transparent refrigerator door/window comprising: a glass substrate; first and second coatings on opposite major surfaces of the glass substrate; wherein the first coating is an anti-reflection coating or a low-E coating; and wherein the second coating is a combination anti-reflective and low-E coating that comprises a transparent conductive layer comprising ITO that is located between at least a dielectric layer comprising silicon oxynitride and a dielectric layer comprising silicon oxide, and wherein the dielectric layer comprising silicon oxynitride is located between at least the glass substrate and the transparent conductive layer comprising ITO.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Referring now more particularly to the drawings in which like reference numbers indicate like parts/elements throughout the several views.

In certain example embodiments of this invention, refrigerator doors (which includes freezer doors) 100 are provided for use in display areas where refrigerated merchandise (e.g., frozen or chilled food) is displayed. It is desired to increase energy efficiency of the doors and thus of the refrigerated display system, while at the same time reducing visible reflectance from the doors to make it easier for customers to see merchandise which is being displayed behind the transparent doors 100. Refrigerator doors (including windows) 100 according to certain example embodiments of this invention include one or more AR coatings (e.g., 7a, 7b, 7c, 9a, 9b), at least one/some of which (7a, 7b, 7c) including a transparent conductive layer (e.g., of or including ITO) so as to also function as a low-E coating. Improvements can be achieved by combining, in one coating (e.g., 7a, 7b, 7c), AR functionality and low-E functionality. It is also possible that low-iron type glass (1, 2 and/or 3) may be used in the doors 100 in certain example instances, which renders the refrigerator doors 100 even more transparent to visible light. In certain example embodiments, the combination AR/low-E coating (7a, 7b, and/or 7c) may include an IR reflecting layer 20 of or including indium-tin-oxide (ITO) located between at least a first dielectric layer of or including silicon oxynitride 23 and a second dielectric layer of or including silicon oxide 25 (e.g., see FIG. 4). In certain example embodiments, two such combination AR/low-E coatings 7a, 7b are provided in the refrigerator door (e.g., see FIGS. 1(a), 2 and 3). In other example embodiments, three such combination AR/low-E coatings 7a, 7b and 7c are provided in the refrigerator door (e.g., see FIG. 1(b)). In still other example embodiments, just one such combination AR/low-E coating 7a may be provided in the refrigerator door (e.g., see FIGS. 2-3).

FIGS. 1(a), 1(b), 2 and 3 illustrate refrigerator doors/windows according to various embodiments of this invention, the doors including AR coatings 9a, 9b, low-E coatings 11, and combination AR/low-E coatings 7a, 7b, 7c. For example, the transparent refrigerator door of FIGS. 1(a)-(b) include three glass substrates 1, 2 and 3, which are spaced apart from each other via spacers 4 so that air gaps 5 are defined between adjacent substrates. Warm-edge spacers 4 may be provided around the periphery of the substrates 1-3, e.g., so as to help maintain the substrates 1-3 in substantially parallel spaced apart relation to one another. The air gaps 5 may optionally be filled with gas such as argon, xenon, or the like. Each glass substrate 1, 2 and 3 may be from about 1-8 mm thick, more preferably from about 2-6 mm thick. Float glass substrates, which are soda lime silica based, are used in example embodiments of this invention.

Figure 1A:
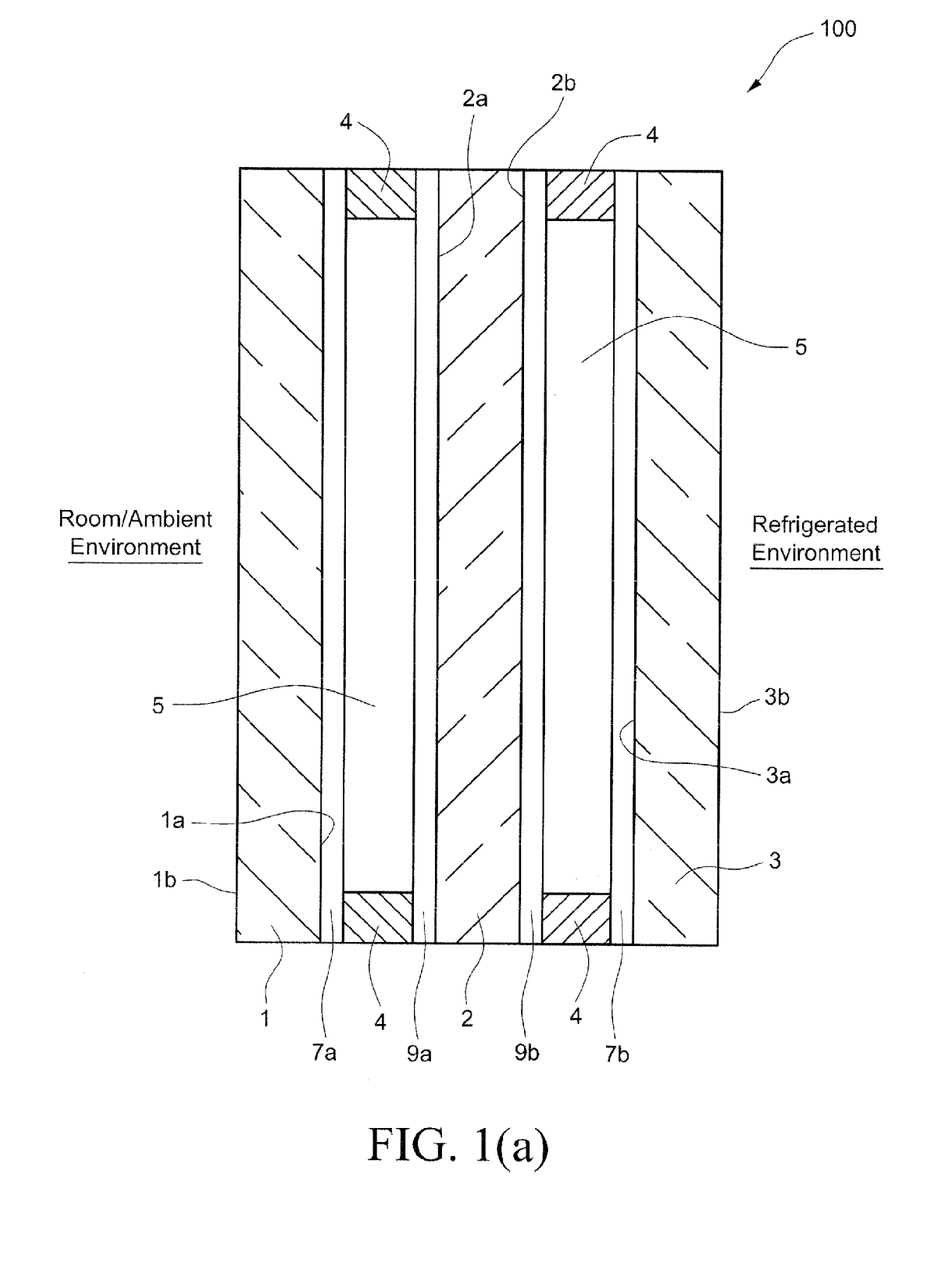
FIG. 1(a) is a cross sectional view illustrating a refrigerator door according to an example embodiment of this invention.

In FIG. 1(a) for example, combination AR/low-E coating 7a is provided on (directly or indirectly) the interior surface 1a of outer glass substrate 1 and combination AR/low-E coating 7b is provided on (directly or indirectly) the interior surface 3a of inner glass substrate 3. Meanwhile, AR coating 9a (which has no metallic or TCO IR reflecting layer) is provided on one major interior surface 2a of inner glass substrate 2 and AR coating 9b (which has no metallic or TCO IR reflecting layer) is provided on the other major interior surface 2b of inner glass substrate 2. An "interior" surface of a glass substrate of a refrigerator door/window herein is defined as a surface which does not directly face either the refrigerated environment or the room/ambient environment. Thus, in FIGS. 1(a)-(b) and 3 for example, surfaces 1a, 2a, 2b and 3a are glass substrate interior substrate surfaces, whereas surfaces 1b and 3b are exterior substrate surfaces.

Figure 1B:
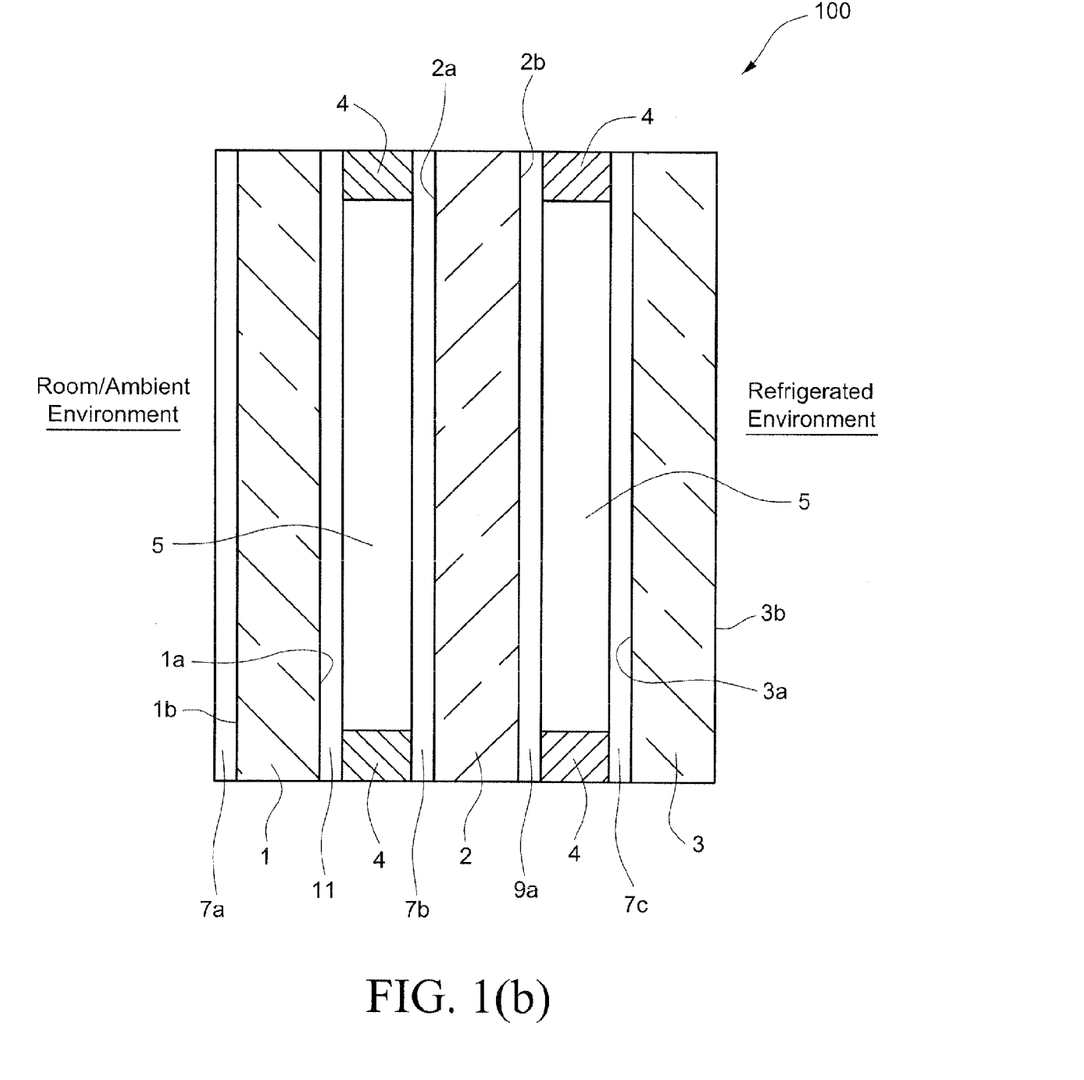
FIG. 1(b) is a cross sectional view illustrating a refrigerator door according to another example embodiment of this invention.

In FIG. 1(b) for example, combination AR/low-E coating 7a is provided on (directly or indirectly) the exterior surface 1b of glass substrate 1, AR/low coating 7b is provided on (directly or indirectly) interior surface 2a of glass substrate 2, and AR/low coating 7c is provided on (directly or indirectly) the interior surface 3a of inner glass substrate 3. Meanwhile, AR coating 9a (which has no metallic or TCO IR reflecting layer) is provided on interior surface 2b of inner glass substrate 2 and low-E coating 11 (which has one or more Ag based IR reflecting layers) is provided on interior surface 1a of glass substrate 1.

Figure 2:
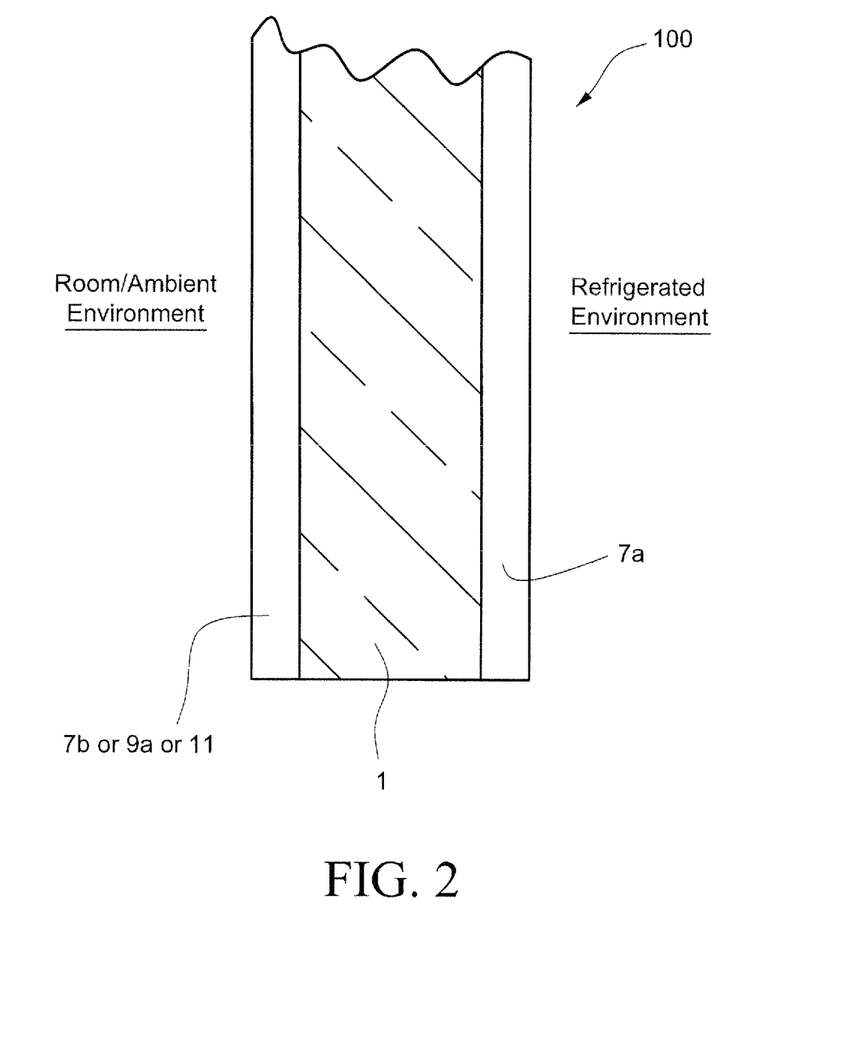
FIG. 2 is a cross sectional view illustrating a refrigerator door according to another example embodiment of this invention.
Figure 3:
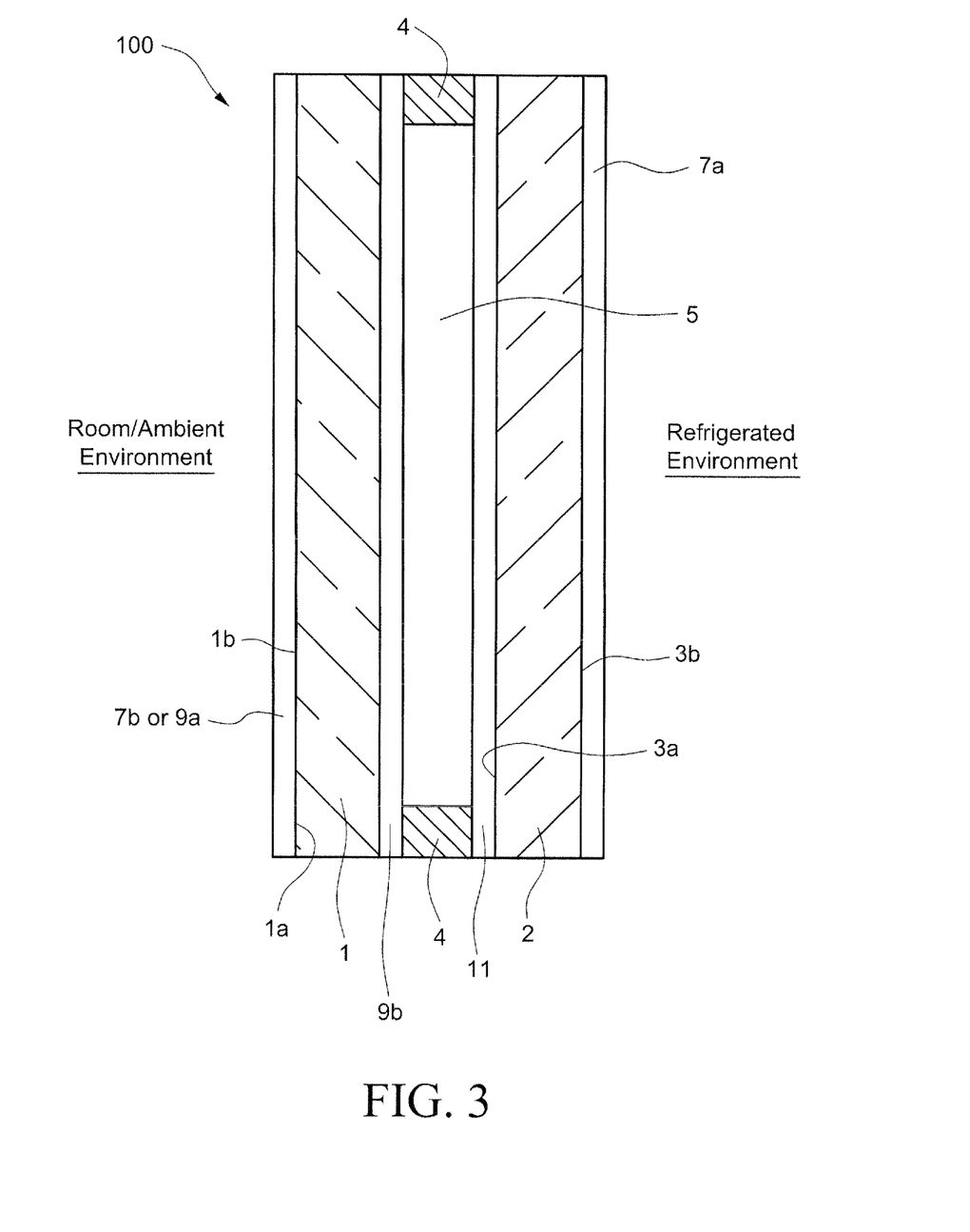
FIG. 3 is a cross sectional view illustrating a refrigerator door according to another example embodiment of this invention.

Example combination AR/low-E coatings 7a, 7b, 7c, AR coatings 9a, 9b, and low-E coatings 11 which may be used in FIGS. 1-3 are described below.

Figure 4:
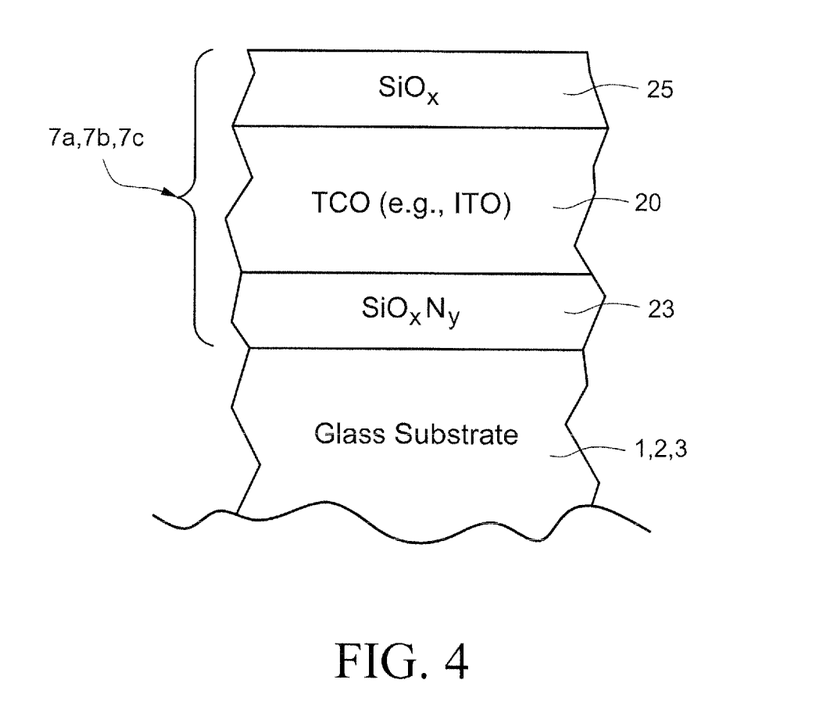
FIG. 4 is a cross sectional view illustrating a coating according to an example embodiment of this invention, where the coating has both AR functionality and low-F functionality.

FIG. 4 is a cross sectional view of an example coating that is a combination AR/low-E coating 7 that may be used for one, two or all three of combination AR/low-E coatings 7a, 7b and 7c in FIGS. 1(a)-1(b), 2 and 3. The coating may be deposited via sputter deposition in example embodiments. In this embodiment, transparent dielectric layer 23 adjacent the glass substrate (1, 2 or 3) is of or includes silicon oxynitride, transparent conductive IR reflecting layer 20 is a transparent conductive oxide (TCO) such as being of or including indium-tin-oxide (ITO), and transparent dielectric layer 25 is of or includes silicon oxide (e.g., $SiO_2$). Any silicon nitride or silicon oxynitride inclusive layer (e.g., layer 23) herein may optionally be doped with a metal such as aluminum in certain example embodiments. For example, silicon oxynitride layer 23 may be doped with from about 0.5-10% aluminum, more preferably from about 2-6% aluminum (atomic % for all such percentages herein) in example embodiments.

In the combination AR/low-E coating, layers 23 and 25 are provided for AR purposes, whereas transparent conductive layer 20 is provided for low-E IR reflecting purposes. Thus, the coating 7 (i.e., 7a, 7b, and/or 7c) functions as both a low-E coating and an AR coating for the reasons explained herein. Silicon oxide layer 25 preferably has an index of refraction (n) of from about 1.5 to 1.7, more preferably from about 1.5 to 1.6, in example embodiments of this invention. Silicon oxynitride layer 23 preferably has an index of refraction (n) of from about 1.65 to 1.85, more preferably from about 1.65 to 1.75, in example embodiments of this invention. And ITO inclusive layer 20 preferably has a higher index of refraction than layers 23 and 25, in providing for an AR type layer structure for the coating 7. ITO layer 20 preferably has an index of refraction (n) at least about 0.2 or 0.1 higher than layers 23 and 25. In example embodiments, ITO layer 20 has an index of refraction (n) of from about 1.8 to 2.0, more preferably from about 1.85 to 1.95, with an example index being about 1.9. The refractive index ranges herein (measured at wavelength of 450 nm) of the layers shown in FIG. 4 allow the coating 7 to function as an AR coating (in addition to have low-E properties), and in example embodiments a coating (7a, 7b or 7c) reduces visible reflection by approximately 2.5 to 4.0% (e.g., about 3.2%) per side/application. In example embodiments of this invention, silicon oxynitride inclusive layer 23 is from about 10-150 nm thick, more preferably from about 10-100 nm thick, more preferably from about 20-60 nm thick, and even more preferably from about 30-50 nm thick. In example embodiments of this invention, silicon oxide inclusive layer 25 may be doped with small amounts of other material (e.g., nitrogen and/or aluminum) and is from about 10-200 nm thick, more preferably from about 40-140 nm thick, and even more preferably from about 70-110 nm thick, with an example being about 90 nm thick.

In example embodiments of this invention, transparent conductive ITO inclusive layer 20 of coating 7 (referring to coatings 7a, 7b and 7c) is fairly thick to provide low emissivity and low sheet resistance, while being thin enough to still allow visible transmission therethrough so that customers can see food in the refrigerated area behind the door(s). In example embodiments, ITO based layer 20 is from about 60-220 nm thick, more preferably from about 75-180 nm thick, even more preferably from about 90-130 nm thick, and most preferably from about 100-120 nm thick (e.g., about 90 nm thick). Thus, in example embodiments, ITO layer 20 has a low sheet resistance while maintaining visible transmission of at least about 30%, 40%, 50%, or even at least about 60%. In example embodiments, ITO layer 20 (and thus coating 7) may have an emissivity (normal or hemispherical) of less than or equal to 0.40, more preferably less than or equal to about 0.30, even more preferably less than or equal to about 0.25, with an example emissivity being about 0.2. In example embodiments, ITO layer 20 (and thus coating 7) may have sheet resistance ($R_s$) of less than or equal to about 40 ohms/square, more preferably less than or equal to about 30 ohms/square, and most preferably less than or equal to about 20 ohms/square. Optionally, layer 23 may be of silicon nitride (e.g., $Si_3N_4$), which may be doped with small amounts of aluminum and/or oxygen, and may have the same thickness ranges discussed above in connection with layer 23. And optionally, other non-illustrated layers may also be included in the coating. For example, a layer of or including titanium oxide and a layer of or including silicon nitride may be provide between the supporting glass substrate and layer 23, with the silicon nitride layer being closest to the glass substrate. This coating, shown in FIG. 4 and described above for example, may be used for combination low-E/AR coatings 7a, 7b and 7c shown in FIGS. 1(a), 1(b), 2 and 3.

TABLE 1

(Example Materials/Thicknesses for Coatings 7a, 7b, 7c)

| Layer | Range (nm) | More Preferred (nm) | Example (nm) |
|---|---|---|---|
| $SiO_xN_y$ (23) | 10-100 nm | 20-60 nm | 30-50 nm |
| ITO (20) | 60-220 nm | 75-180 nm | 90-130 nm |
| $SiO_x$ (25) | 10-200 nm | 40-140 nm | 70-110 nm |

To increase the visible transmission of a refrigerator door 100, one or more panes of thereof may include a thin film single- or multi-layer anti-reflective (AR) coating 9a, 9b. Example AR coatings 9a and/or 9b are shown in the refrigerator doors of FIGS. 1(a), 1(b), 2, and 3. Example antireflective (AR) coatings 9a, 9b are described in, for example, U.S. Pat. Nos. 7,588,823; 6,589,658; 6,586,102, Ser. Nos. 12/923,146, 20090148709; 20090133748; 20090101209; 20090032098; and 20070113881, the entire contents of which are all hereby incorporated herein by reference. In certain example embodiments, an approximately 3-4% estimated boost in visible transmission is achievable when an AR coating 9a, 9b is applied to one side of a glass substrate 1, 2 or 3, and an approximately 6-8% estimated boost in visible transmission is achievable when an AR coating 9a, 9b is applied to both sides of a glass substrate 1, 2, or 3.

Example ranges for the thicknesses of each layer in an example AR coating (9a and/or 9b) are as follows, moving away from the supporting glass substrate (1, 2 or 3):

TABLE 2

(Example Materials/Thicknesses for coatings 9a and 9b)

| Layer | Range (nm) | More Preferred (nm) | Example (nm) |
|---|---|---|---|
| $SiO_xN_y$ | 75-135 nm | 94-115 nm | 95 nm |
| $TiO_x$ | 10-35 nm | 12-22 nm | 21 nm |
| $SiO_x$ | 70-130 nm | 89-109 nm | 105 nm |

Similar to the above, low-E coatings 11 may also be used in certain example embodiments of this invention (e.g., see FIGS. 1(b), 2 and 3), and may be provided to one or both surfaces of any one or more of the glass substrates. A silver-based low-E coating 11 suitable for certain example embodiments of this invention may be any one of the low-E coatings described in U.S. Patent Document Nos. 2009/0214880; 2009/0205956; 2010/0075155; 2010/0104840, and Ser. No. 12/662,561, the entire contents of which are hereby incorporated herein by reference. Example low-E coatings 11 having two silver based layers are described in, for example, U.S. patent Ser. No. 12/453,125 and 2009/0324934, the entire contents of each of which are hereby incorporated herein by reference. Another example low-E coating 11 is described in U.S. Patent Publication 2012/0090246 (incorporated herein by reference) and is charted as follows with the layers being identified moving away form the support glass substrate 1, 2 or 3.

TABLE 3

Example Materials/Thicknesses - Low-E coating(s) 11

| Layer Glass (1-10 mm thick) | Preferred Range (Å) | More Preferred (Å) | Example (Å) |
|---|---|---|---|
| $Si_xN_y$ (layer 3) | 40-250 Å | 125-175 Å | 150 Å |
| $TiO_x$ (layer 4) | 40-400 Å | 50-200 Å | 70-120 Å |
| $Si_xN_y$ (optional layer 5) | 40-450 Å | 50-150 Å | 75 Å |
| $ZnO_x$ (layer 7) | 10-300 Å | 50-85 Å | 70 Å |
| Ag (layer 9) | 100-180 Å | 125-160 Å | 139 Å |
| $NiCrO_x$ (layer 11) | 4-14 Å | 4-12 Å | 5 Å |
| $SnO_2$ (layer 13) | 0-1,000 Å | 200-700 Å | 585 Å |
| $Si_xN_y$ (layer 14) | 50-450 Å | 60-100 Å | 80 Å |
| $SnO_2$ (layer 15) | 30-250 Å | 50-200 Å | 109 Å |
| $ZnO_x$ (layer 17) | 10-300 Å | 40-150 Å | 96 Å |
| Ag (layer 19) | 130-220 Å | 140-200 Å | 169 Å |
| $NiCrO_x$ (layer 21) | 4-14 Å | 4-12 Å | 5 Å |
| $SnO_2$ (layer 23) | 0-750 Å | 40-200 Å | 127 Å |
| $Si_3N_4$ (layer 25) | 0-750 Å | 80-320 Å | 215 Å |

To further boost the light transmission through the refrigerator door, low-iron substrates may optionally be used for one or more of the glass substrates 1, 2 and/or 3. Example low-iron glass substrates are disclosed, for example, in U.S. application Ser. No. 12/385,318, as well as in U.S. Publication Nos. 2006/0169316; 2006/0249199; 2007/0215205; 2009/0223252; 2010/0122728; and 2009/0217978, the entire contents of each of which are all hereby incorporated herein by reference. Example details of a low iron substrate (1, 2 and/or 3) will now be provided. FIGS. 1(a)-(b) for example illustrate example refrigerator doors in accordance with example embodiments of this invention, including glass substrates 1, 2 and 3. In certain example embodiments, all three substrates 1-3 may be low-iron substrates. In certain other example embodiments, the center pane 2 may be a low-iron substrate and the outer two substrates 1 and 3 may be float glass substrates having a higher and thus traditional range of iron content. The substrates 1-3 may, however, be mixed and matched between traditional float glass and low-iron float glass substrates in different example embodiments. In certain example embodiments, no low-iron substrates may be provided, and in certain other example embodiments, only low-iron substrates may be provided.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

In certain example embodiments of this invention, there is provided a transparent refrigerator door/window comprising: at least first and second glass substrates; a combination anti-reflective and low-E coating on an interior surface of the first glass substrate, so that the coating is not exposed to a refrigerated environment adjacent the refrigerator door/window or a room environment adjacent the refrigerator door/window; wherein the coating comprises a transparent conductive layer comprising or consisting essentially of indium-tin-oxide (ITO) that is located between at least a dielectric layer comprising or consisting essentially of silicon oxynitride and a dielectric layer comprising or consisting essentially of silicon oxide, and wherein the dielectric layer comprising silicon oxynitride is located between at least the first glass substrate and the transparent conductive layer comprising ITO.

In the refrigerator door/window of the immediately preceding paragraph, a gap may be provided between the first and second glass substrates. The gap may be filled with air and/or an inert gas.

In the refrigerator door/window of any of the preceding two paragraphs, a spacer seal may be provided proximate an edge of the first and second glass substrates in order to couple the first and second glass substrates to one another and to provide a gap therebetween.

In the refrigerator door/window of any of the preceding three paragraphs, the refrigerator door/window may have a visible transmission of at least about 50%, more preferably of at least about 60%.

In the refrigerator door/window of any of the preceding four paragraphs, the layer comprising silicon oxynitride may be located between and directly contacting the first glass substrate and the transparent conductive layer comprising ITO.

In the refrigerator door/window of any of the preceding five paragraphs, the layer comprising silicon oxide may directly contact the transparent conductive layer comprising ITO.

In the refrigerator door/window of any of the preceding six paragraphs, the layer comprising silicon oxide may be an outermost layer of the coating.

In the refrigerator door/window of any of the preceding seven paragraphs, the coating may consists essentially of the transparent conductive layer comprising indium-tin-oxide (ITO), the dielectric layer comprising silicon oxynitride, and the dielectric layer comprising silicon oxide.

In the refrigerator door/window of any of the preceding eight paragraphs, the transparent conductive layer comprising indium-tin-oxide (ITO) may have a refractive index (n) at least 0.1 higher (more preferably at least 0.15 higher) than respective refractive indices of the dielectric layer comprising silicon oxynitride and the dielectric layer comprising silicon oxide.

In the refrigerator door/window of any of the preceding nine paragraphs, the transparent conductive layer comprising ITO may be from about 60-220 nm thick, more preferably from about 90-130 nm thick.

In the refrigerator door/window of any of the preceding ten paragraphs, the second glass substrate may be closer to, or farther from, a refrigerated environment adjacent the door/window than is the first glass substrate.

The refrigerator door/window of any of the preceding eleven paragraphs may further comprise a third glass substrate, wherein the second glass substrate may be located between at least the first and third glass substrates, and wherein another combination anti-reflective and low-E coating may be located on an interior surface of the third glass substrate, wherein the another coating may comprise or consist essentially of a transparent conductive layer comprising indium-tin-oxide (ITO) that is located between at least a dielectric layer comprising silicon oxynitride and a dielectric layer comprising silicon oxide, and wherein the dielectric layer comprising silicon oxynitride may be located between at least the third glass substrate and the transparent conductive layer comprising ITO of the another coating.

In the refrigerator door/window of any of the preceding twelve paragraphs, an anti-reflective locating may be located on an interior surface of the second glass substrate.

In the refrigerator door/window of any of the preceding thirteen paragraphs, a low-E coating, including at least one IR reflecting layer comprising silver located between at least first and second dielectric layers, may be located on an interior surface of the second glass substrate.

In the refrigerator door/window of any of the preceding fourteen paragraphs, the coating and/or the another coating may have a sheet resistance of less than or equal to about 30 ohms/square.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A transparent refrigerator door including a window, comprising:
   a first glass substrate of the refrigerator door, the refrigerator door being attached to a refrigerator housing a refrigerated environment, and wherein the first substrate is part of the window of the transparent refrigerator door;
   first, second, third and fourth coatings adapted to be in this order moving away from an ambient environment toward a refrigerated environment, the first and second sputter-deposited coatings on opposite major surfaces of the first glass substrate;

wherein the first coating is a combination anti-reflective and low-E coating that comprises a transparent conductive layer comprising indium-tin-oxide (ITO) that is located between and directly contacting a dielectric layer comprising silicon oxynitride and a dielectric layer comprising silicon oxide, and wherein the dielectric layer comprising silicon oxynitride is located between at least the first glass substrate and the transparent conductive layer comprising ITO;

wherein the second coating is a silver based low-E coating and thus includes at least one infrared (IR) reflecting layer comprising silver, and the first coating does not contain any IR reflecting layer comprising silver;

second and third glass substrates, where the second glass substrate is located between the first and third glass substrates;

the third and fourth coatings provided on opposite major surfaces of the second glass substrate, wherein the third coating does not contain any IR reflecting layer comprising silver and is a combination anti-reflective and low-E coating that comprises a transparent conductive layer comprising indium-tin-oxide (ITO) that is located between and directly contacting a dielectric layer comprising silicon oxynitride and a dielectric layer comprising silicon oxide, and wherein the dielectric layer comprising silicon oxynitride in the third coating is located between at least the second glass substrate and the transparent conductive layer comprising ITO in the third coating;

wherein the fourth coating is an anti-reflective (AR) coating that contains no metallic or transparent conductive oxide (TCO) IR reflective layer;

wherein the refrigerator door is located between the refrigerated environment on one side and the ambient environment on the other side, and wherein the first coating is immediately adjacent to and exposed to the ambient environment;

wherein the transparent conductive layer comprising ITO of the first coating is from about 90-130 nm thick, the dielectric layer comprising silicon oxynitride of the first coating is from about 30-50 nm thick, and the dielectric layer comprising silicon oxide of the first coating is from about 70-110 nm thick.

2. The refrigerator door of claim 1, wherein in each of the first and third coatings the dielectric layer comprising silicon oxynitride and/or the dielectric layer comprising silicon oxide is doped with aluminum.

3. The refrigerator door of claim 1, wherein in each of the first and third coatings the dielectric layer comprising silicon oxide further comprises nitrogen.

* * * * *